US007778195B2

(12) United States Patent
Takai et al.

(10) Patent No.: US 7,778,195 B2
(45) Date of Patent: Aug. 17, 2010

(54) NETWORK, SERVER APPARATUS, IP CORRESPONDING TERMINAL DEVICE, AND SPEECH-QUALITY CONTROL METHOD USED IN THE SAME

(75) Inventors: Minako Takai, Tokyo (JP); Takanori Hiroshima, Tokyo (JP)

(73) Assignee: NEC Infrontia Corporation, Tokyo (JP)

( * ) Notice: Subject to any disclaimer, the term of this patent is extended or adjusted under 35 U.S.C. 154(b) by 1608 days.

(21) Appl. No.: 10/968,150

(22) Filed: Oct. 20, 2004

(65) Prior Publication Data

US 2005/0083922 A1 Apr. 21, 2005

(30) Foreign Application Priority Data

Oct. 21, 2003 (JP) .............................. 2003-360132

(51) Int. Cl.
*G01R 31/08* (2006.01)
*H04L 12/66* (2006.01)
(52) U.S. Cl. ........................................ 370/252; 370/355
(58) Field of Classification Search ........................ None
See application file for complete search history.

(56) References Cited

U.S. PATENT DOCUMENTS 6,967,958 B2 * 11/2005 Ono et al. ................... 370/401

7,002,919 B1 * 2/2006 El-Sayed .................... 370/252

(Continued)

FOREIGN PATENT DOCUMENTS

EP 1 328 106 A1 7/2003
GB 2 398 703 A 8/2004

(Continued)

OTHER PUBLICATIONS

B2BUA: Enabling Class 5 Capabilities in SIP Designs (Sep. 2003).*

(Continued)

*Primary Examiner*—Hong Cho
*Assistant Examiner*—Eunsook Choi
(74) *Attorney, Agent, or Firm*—Foley & Lardner LLP

(57) ABSTRACT

A network includes Internet protocol (IP) terminals for establishing communication using an initiation protocol used in connection-oriented communication in which connection to a destination is confirmed over an IP network for the communication; and a server apparatus constituting the network along with the IP terminals. The server apparatus includes a detecting unit for detecting a speech quality between the IP terminals; a calculating unit for calculating an optimal speech quality based on the detected speech quality information; and a notifying unit for notifying the IP terminals establishing communication of the calculated optimal speech quality. The IP terminals establish communication with the speech quality being set to the optimal speech quality, which the server apparatus notifies to the IP terminals.

20 Claims, 10 Drawing Sheets

U.S. PATENT DOCUMENTS

| | | | |
|---|---|---|---|
| 7,120,122 B1 * | 10/2006 | Starr et al. | 370/250 |
| 7,149,515 B2 | 12/2006 | Hallin et al. | |
| 7,394,807 B2 * | 7/2008 | Hamiti et al. | 370/389 |
| 2002/0131604 A1 | 9/2002 | Amine | |
| 2003/0023730 A1 * | 1/2003 | Wengrovitz et al. | 709/227 |
| 2003/0123388 A1 * | 7/2003 | Bradd | 370/230 |
| 2003/0131121 A1 | 7/2003 | Quittek et al. | |
| 2004/0125923 A1 | 7/2004 | See et al. | |
| 2004/0205209 A1 * | 10/2004 | Wengrovitz et al. | 709/230 |
| 2005/0083916 A1 | 4/2005 | Itagaki et al. | |

FOREIGN PATENT DOCUMENTS

| | | |
|---|---|---|
| GB | 2 399 960 A | 9/2004 |
| JP | 2001-127882 A | 5/2001 |
| JP | 2003-179638 A | 6/2003 |
| JP | 2004-072242 A | 3/2004 |
| JP | 2005-129982 A | 5/2005 |
| JP | 2007-510324 A | 4/2007 |
| WO | WO 01/69899 A3 | 9/2001 |

OTHER PUBLICATIONS

H. Zou et al., "Prototyping SIP-based VoIP Services in Java," vol. 2, Communication Technology Proceedings, WCC-ICCT 2000 International.

J. Rosenberg et al., "SIP: Session Initiation Protocol," Standards Track, 2002, pp. 1, 8-34, The Internet Society.

J. Rosenberg et al., An Offer/Answer Model with the Session Description Protocol (SDP), Standards Track, 2002, The Internet Society, pp. 1-25.

* cited by examiner

NETWORK, SERVER APPARATUS, IP CORRESPONDING TERMINAL DEVICE, AND SPEECH-QUALITY CONTROL METHOD USED IN THE SAME

BACKGROUND OF THE INVENTION

1. Field of the Invention

The present invention relates to a network, a server apparatus, an Internet protocol (IP) terminal device, and a speech-quality control method used in the network, the server apparatus, and the IP terminal device. Particularly, the present invention relates to control of the speech quality in a network including IP terminal devices.

2. Description of the Related Art

This type of network has heretofore been constituted by connection of an IP-PBX (Internet Protocol-Private Branch exchange) to a fixed phone terminal, a radio terminal such as a personal handy-phone system (PHS), a voice over Internet protocol (VoIP) terminal or the like via a local area network (LAN).

As the VoIP terminal, in addition to an IP phone terminal and an Internet phone terminal, there is a session initiation protocol terminal (hereinafter they are collectively called IP terminal). The SIP is a communication protocol for use in starting or ending multimedia communication such as sound communication (fixed phone, cellular phone, etc.), video communication such as television phone, chat (conversation by characters) and the like in an environment of an IP network using data having a form referred to as an IP packet.

In the IP network, in general, connection-less type communication is performed without confirming connection to a target as in electronic mails. On the other hand, in the fixed phone, in general, connection type communication is performed while confirming the connection with the target. The SIP realizes the connection type communication in the IP network.

The SIP basically comprises methods (operations) such as INVITE (session between users is established), ACK (acknowledgment), CANCEL (INVITE is ended during the establishment of the session), and BYE (the end of the session). The respective methods are exchanged as requests and responses to the requests between clients and servers to thereby establish or end the session.

Moreover, the SIP has characteristics that applications can be comparatively easily prepared. For example, when a new service is added to H.323 of ITU-T for use in the IP phone, an H.450.x protocol which defines the H.323 additional service is added, and all H.323 end points on the network and software of a gate keeper need to be updated. However, in the SIP, an SIP application server which provides the new service is added, and the corresponding application is added. Then, the new service is usable.

In the SIP described above, an "offer/answer model" using a session description protocol (SDP) is defined. In this "offer/answer model", the SDP is used in the bodies of "INVITE" and "200 OK" corresponding to the "INVITE" in order to negotiate the media information used in a session. The "INVITE" denotes a method used for establishing a session between subscribers and the "200 OK" denotes a success response.

In the negotiation of session information in the "offer/answer model", an offerer who wants to establish the session transmits the session information (hereinafter referred to as an offer), which is represented in the SDP and which the offerer wants to use in the session, to an answerer. The offer includes the IP address, the port number, and the types of the medium and the CODEC. The offer is described in the body of the SIP message.

In response to the offer, the answerer transmits the session information (hereinafter referred to as an answer), which the answerer wants to use in the session, to the offerer. The answer is also described in the body of the SIP message. In this manner, the negotiation of the session information is completed between the offerer and the answerer.

FIG. 9 is a sequence chart showing a known bandwidth control operation. Specifically, when the bandwidth control is to be performed between IP terminals (for example, the Sip corresponding terminals described above), in e1 in FIG. 9, an Sip corresponding terminal #1 transmits "INVITE (w/SDP)" including the offer (the bandwidth information) to an Sip corresponding terminal #2. In e2, the Sip corresponding terminal #2 returns "180 Ringing" to the Sip corresponding terminal.

In e3, the Sip corresponding terminal #2 determines an optimal bandwidth from the bandwidth information transmitted from the Sip corresponding terminal #1. In e4, the Sip corresponding terminal #2 returns "200 OK(w/SDP)" including the bandwidth information to the Sip corresponding terminal #1 as a response. In e5, the Sip corresponding terminal #1 returns "ACK" to the Sip corresponding terminal #2. In this manner, the session is established between the Sip corresponding terminals #1 and #2.

FIG. 10 is a sequence chart showing a known adjustment operation of an audio level. When the adjustment of an audio level is to be performed in the IP terminals (for example, the Sip corresponding terminals described above), in f1 and f2 in FIG. 10, the Sip corresponding terminals #1 and #2 respectively set audio levels. In f3, the Sip corresponding terminal #1 transmits "INVITE (w/SDP)" to the Sip corresponding terminal #2.

In f4 and f5, in response to the "INVITE (w/SDP)", the Sip corresponding terminal #2 returns "180 Ringing" and "200 OK(w/SDP)" to the Sip corresponding terminal #1. In f6, the Sip corresponding terminal #1 returns "ACK" to the Sip corresponding terminal #2. In this manner, the session is established between the Sip corresponding terminals #1 and #2.

Japanese Unexamined Patent Publication (JP-A) No. 2000-179638, "SIP: Session Initiation Protocol" [RFC (Request For Comment) 3261, 8 to 34 pages, June 2002], and "An Offer/answer Model with the Session Description Protocol (SDP)" [RFC 3264, 1 to 25 pages, June 2002] disclose the above-described earlier techniques.

However, there are problems in that the bandwidth control can originally be performed only between IP terminals in known communication between the IP terminals and in that each IP terminal must individually adjust the audio level in known communication between IP terminals.

SUMMARY OF THE INVENTION

In order to resolve the problems described above, it is an object of the present invention to provide a network, a server apparatus, an IP terminal device, and a speech-quality control method used in the network, the server apparatus, and the IP terminal device, which are capable of establishing an optimal communication between terminals without negotiation between the terminals.

The present invention provides, in its first aspect, a network including Internet protocol (IP) terminals for establishing communication using an initiation protocol used in connection-oriented communication in which connection to a destination is confirmed over an IP network for the communication; and a server apparatus constituting the network along with the (P terminals. The server apparatus includes a detecting unit for detecting a speech quality between the IP terminals; a calculating unit for calculating an optimal speech quality based on the detected speech quality information; and a notifying unit for notifying the IP terminals establishing communication of the calculated optimal speech quality. The IP terminals establish communication with the speech quality being set to the optimal speech quality, which the server apparatus notifies to the IP terminals.

The present invention provides, in its second aspect, a server apparatus in a network including IP terminals for establishing communication using an initiation protocol used in connection-oriented communication in which connection to a destination is confirmed over an IP network for the communication. The server apparatus includes a detecting unit for detecting a speech quality between the IP terminals; a calculating unit for calculating an optimal speech quality based on the detected speech quality information; and a notifying unit for notifying the IP terminals establishing communication of the calculated optimal speech quality.

The present invention provides, in its third aspect, an IP terminal device for establishing communication using an initiation protocol used in connection-oriented communication in which connection to a destination is confirmed over an IP network for the communication. The IP terminal device establishes communication with an optimal speech quality that is calculated based on a speech quality detected in a server apparatus in the network.

The present invention provides, in its fourth aspect, a speech-quality control method of controlling the quality of speech in a network including IP terminals for establishing communication using an initiation protocol used in connection-oriented communication in which connection to a destination is confirmed over an IP network for the communication. A server apparatus constituting the network along with the IP terminals detects a speech quality between the IP terminals; calculates an optimal speech quality based on the detected speech quality information; and notifies the IP terminals establishing communication of the calculated optimal speech quality. The IP terminals establish communication with the speech quality being set to the optimal speech quality, which the server apparatus notifies to the IP terminals.

The network of the present invention modularizes the processing in an IP terminal protocol, for example, the processing in the SIP, by using a back-to-back user agent (B2BUA) mechanism. The modularized processing is incorporated as one of the components in the server apparatus, such as an Internet protocol private branch exchange (IP-PBX). Accordingly, the IP terminal can be controlled as one extension of the IP-PBX in the network according to the present invention.

The server apparatus (the IP-PBX), in which the processing in the IP terminal protocol is modularized and incorporated, has the mechanism capable of determining the audio level or the bandwidth for every kind of the IP terminals, for every network unit to which each extension belongs. In other words, since the server apparatus (the IP-PBX) has a registrar function for the IP terminals serving as extensions, the server apparatus is notified of the IP addresses of the IP terminals when the IP terminals are registered. The server apparatus can determine an optimal speech quality, such as an optimal audio level or bandwidth, from the IP addresses.

For example, in the Sip corresponding terminal, the bandwidth information can be transmitted as session description protocol (SDP) information. Hence, even in the communication between any Sip corresponding terminals including the standard Sip corresponding terminals, which can originally negotiate the bandwidth information only in a peer-to-peer manner, the bandwidth in accordance with the network status can be ensured. Furthermore, even in other IP terminals, interposing the server apparatus (the IP-PBX) for negotiating the bandwidth information allows the same effects to be achieved as in the above case.

Since the server apparatus (the IP-PBX) has the bandwidth control function, the server apparatus can communicate with the IP terminal only when the bandwidth required for the communication can be ensured, thus always maintaining a constant speech quality.

Defining a unique extended format in each IP protocol allows the IP terminal to be notified of the audio level determined by the server apparatus (the format can establish communication in the specified audio level.

It is possible to adjust the audio level or to control the bandwidth in accordance with the registered IP address in the network according to the present invention, so that an optimal communication can be established wherever the mobile terminal accommodating a wireless IAN exists. Even in communication with a terminal having a different audio level, the server apparatus (the IP-PBX) that specifies a certain audio level can establish an optimal communication in the network according to the present invention.

As described above, in the network according to this embodiment, an IP client terminal conforming to an IP typified by the SIP is incorporated in the service provided by the server apparatus (the IP-PBX), and the bandwidth control, which can originally be performed only between terminals, is performed in accordance with the network bandwidth, thus ensuring a stable speech communication.

Although it has been impossible to change the audio level between the IP terminals for every network, interposing the server apparatus (the IP-PBX) allows the audio level to be adjusted for every destination in the network according to the present invention.

Structures and operations described below according to the present invention have the advantage of being capable of establishing an optimal communication between terminals without negotiation between the terminals.

DESCRIPTION OF THE PREFERRED EMBODIMENTS

Figure 1:
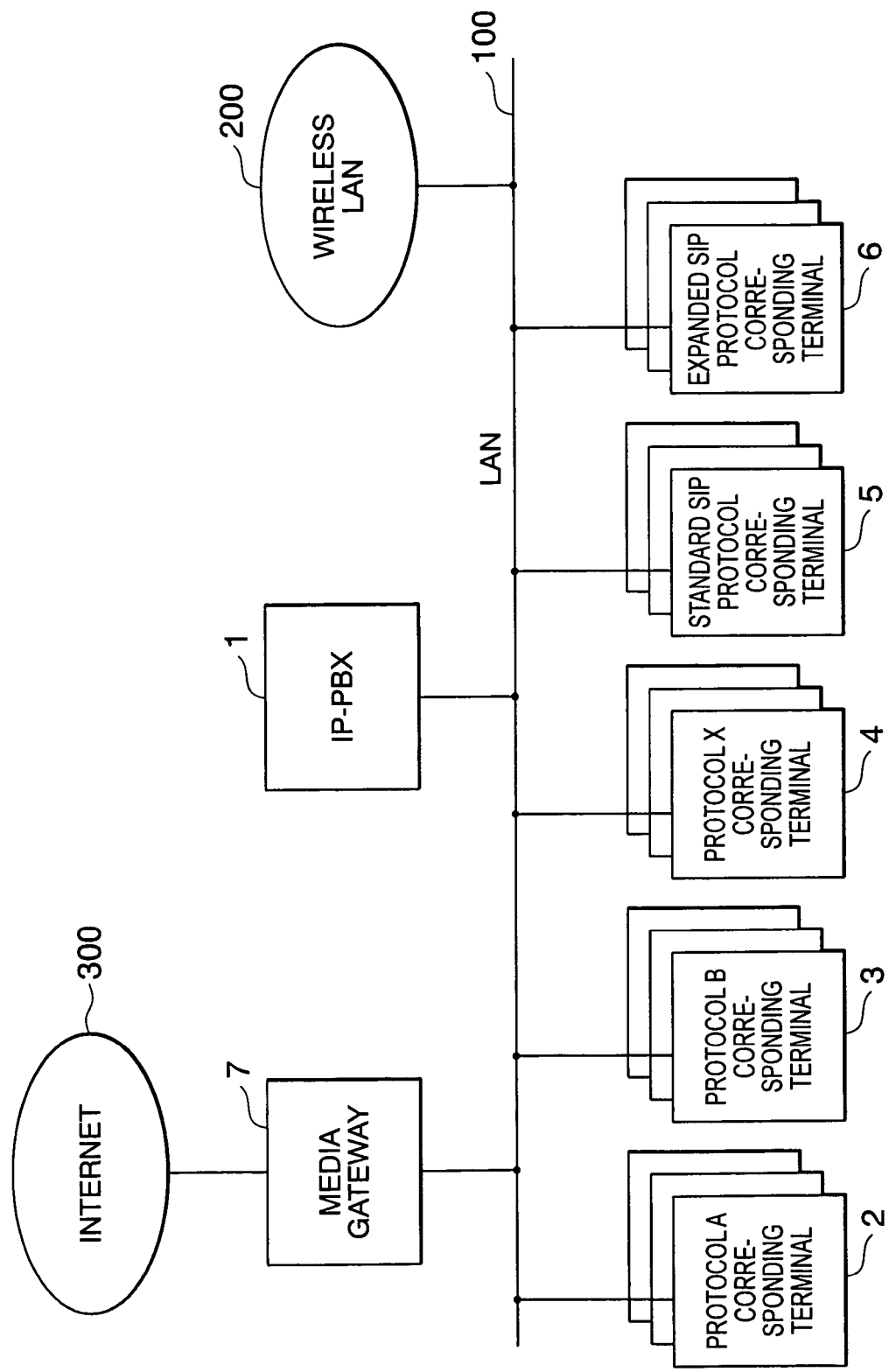
FIG. 1 is a block diagram of a network according to an embodiment of the present invention.

Next, embodiments of the present invention will be described with reference to the drawings. FIG. 1 is a block diagram showing a constitution of a network according to one embodiment of the present invention. In FIG. 1, in the constitution of the network according to one embodiment of the present invention, an Internet protocol-private branch exchange (IP-PBX: IP corresponding private branch exchange) 1, a protocol A corresponding terminal 2, a protocol B corresponding terminal 3, a protocol X corresponding terminal 4, a standard session initiation protocol (SIP) protocol corresponding terminal 5, an expanded SIP protocol corresponding terminal 6, a media gate way 7, and a radio LAN 200 are connected to one another via a local area network (LAN) 100. The constitution is connected to Internet 300 via the media gate way 7.

Figure 2:
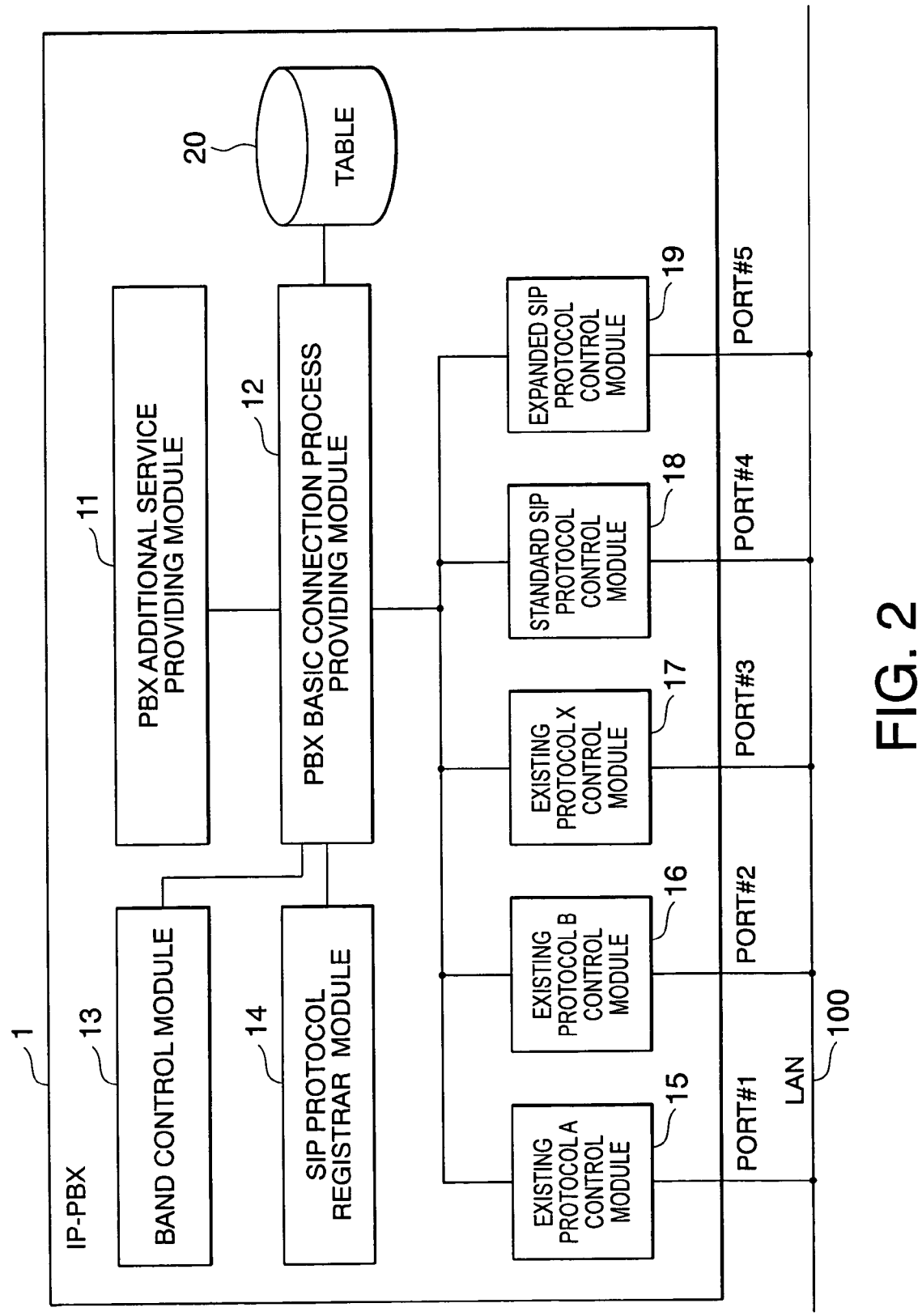
FIG. 2 is a block diagram of an IP-PBX shown in FIG. 1.

FIG. 2 is a block diagram showing a constitution of the IP-PBX 1 of FIG. 1. In FIG. 2, the IP-PBX 1 comprises: a PBX additional service providing module 11; a PBX basic connection process providing module 12; a band control module 13; an SIP protocol registrar module 14; an existing protocol A control module 15; an existing protocol B control module 16, an existing protocol X control module 17; a standard SIP protocol control module 18; an expanded SIP protocol control module 19; and a table 20.

The standard SIP protocol control module 18 and the expanded SIP protocol control module 19 terminate an SIP system protocol, the process of the SIP is constituted into a module using a mechanism of a back to back user agent (B2BUA), and incorporated as one of component groups of the IP-PBX 1, and the module can be realized even by hardware or software. The IP-PBX 1 provides mutual connection, and additional services with respect to each protocol group constituted into the above-described module.

Here, the B2BUA is a logical entity (function) which processes a request (message) as a user agent server, when receiving SIP request (SIP message) from an Sip corresponding terminal of a transmitter. To determine an answer to the request from the Sip corresponding terminal of the transmitter, the B2BUA operates as a user agent client with respect to the Sip corresponding terminal of the transmitter, and produces the request to the Sip corresponding terminal of a transmission target.

That is, in the B2BUA, a private user agent is combined with a public user agent, and the B2BUA operates as a user agent with respect to each network (terminal).

The PBX additional service providing module 11 provides additional services (e.g., call back service, extension interruption service, third party control service, etc.) to the protocol A corresponding terminal 2, the protocol B corresponding terminal 3, the protocol X corresponding terminal 4, the standard SIP protocol corresponding terminal 5, and the expanded SIP protocol corresponding terminal 6.

The PBX basic connection process providing module 12 provides a basic connection process, and mutual connection with respect to the protocol A corresponding terminal 2, the protocol B corresponding terminal 3, the protocol X corresponding terminal 4, the standard SIP protocol corresponding terminal 5, and the expanded SIP protocol corresponding terminal 6.

The band control module 13 performs a band control process with respect to the protocol A corresponding terminal 2, the protocol B corresponding terminal 3, the protocol X corresponding terminal 4, the standard SIP protocol corresponding terminal 5, and the expanded SIP protocol corresponding terminal 6. The SIP protocol registrar module 14 registers contact information.

The existing protocol A control module 15 is disposed for the protocol A corresponding terminal 2, and converts a signal from the protocol A corresponding terminal 2 into a signal of a protocol (hereinafter referred to as the PBX internal protocol) inside the IP-PBX 1, and transmits the signal to the PBX basic connection process providing module 12. Moreover, the control module converts a signal from the PBX basic connection process providing module 12 into a signal of a protocol A, and transmits the signal to the protocol A corresponding terminal 2.

The existing protocol B control module 16 is disposed for the protocol B corresponding terminal 3, and converts a signal from the protocol B corresponding terminal 3 into a signal of the PBX internal protocol, and transmits the signal to the PBX basic connection process providing module 12. Moreover, the control module converts a signal from the PBX basic connection process providing module 12 into a signal of a protocol B, and transmits the signal to the protocol B corresponding terminal 3.

The existing protocol X control module 17 is disposed for the protocol X corresponding terminal 4, and converts a signal from the protocol X corresponding terminal 4 into a signal of the PBX internal protocol, and transmits the signal to the PBX basic connection process providing module 12. Moreover, the control module converts a signal from the PBX basic connection process providing module 12 into a signal of a protocol X, and transmits the signal to the protocol X corresponding terminal 4.

The standard SIP protocol control module 18 is disposed for the standard SIP protocol corresponding terminal 5, and converts a signal from the standard SIP protocol corresponding terminal 5 into a signal of the PBX internal protocol, and transmits the signal to the PBX basic connection process providing module 12. Moreover, the control module converts a signal (response to the request, or request to the standard SIP protocol corresponding terminal 5) from the PBX basic connection process providing module 12 into a signal of a standard SIP protocol, and transmits the signal to the standard SIP protocol corresponding terminal 5.

The expanded SIP protocol control module 19 is disposed for the expanded SIP protocol corresponding terminal 6, and converts a signal (request) from the expanded SIP protocol corresponding terminal 6 into a signal of the PBX internal protocol, and transmits the signal to the PBX basic connection process providing module 12. Moreover, the control module converts a signal (a response to the request, or a request to the expanded SIP protocol corresponding terminal 6) from the PBX basic connection process providing module 12 into a signal of an expanded SIP protocol a, and transmits the signal to the expanded SIP protocol corresponding terminal 6.

Here, port number (ports #1 to #5) or IP address (local or global IP address) is assigned to each of the existing protocol A control module 15, existing protocol B control module 16, existing protocol X control module 17, standard SIP protocol control module 18, and expanded SIP protocol control module 19. In the table 20, the protocol of the corresponding terminal is held for each assigned port number or IP address. The PBX basic connection process providing module 12 refers to the table 20 to judge the protocol from the port number or the IP address.

Figure 3:
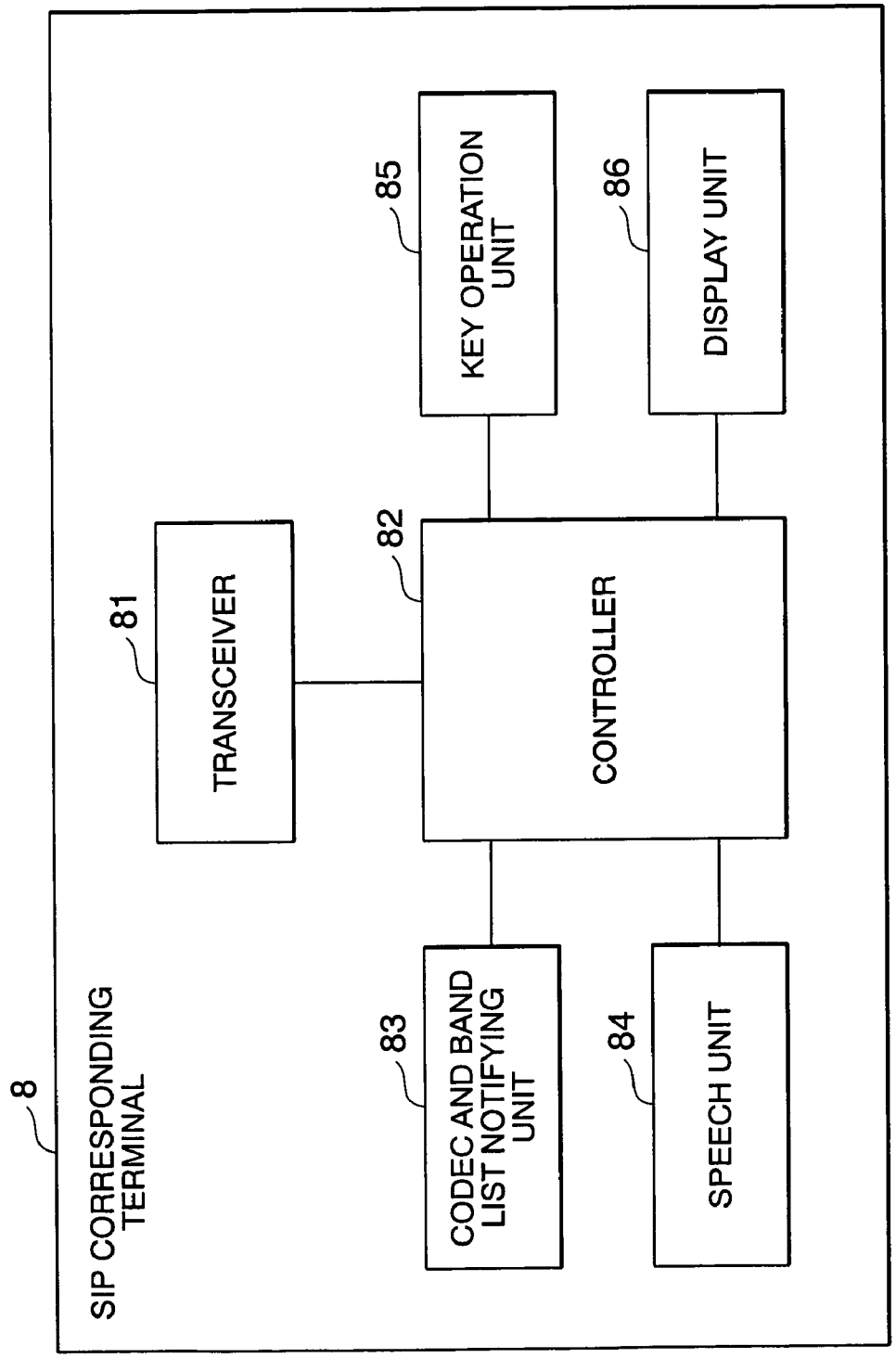
FIG. 3 is a block diagram of an Sip corresponding terminal according to an embodiment of the present invention.

FIG. 3 is a block diagram of an Sip corresponding terminal according to an embodiment of the present invention. Referring to FIG. 3, an Sip corresponding terminal 8 includes a transceiver 81, a controller 82, a CODEC-and-bandwidth-list notifying unit 83, a speech unit 84, a key operation unit 85, and a display unit 86.

The transceiver 81 transmits and receives signals to and from the IP-PBX 1 over the LAN 100. The controller 82 controls each component in the Sip corresponding terminal 8. The CODEC-and-bandwidth-list notifying unit 83 notifies the IP-PBX 1 of a list of the types of CODECs and bandwidth information available in the Sip corresponding terminal 8.

The speech unit 84 is a unit used for performing speech communication with a calling party or a called party. The key operation unit 85 notifies the controller 82 of the content of operation performed by a user. The display unit 86 displays messages including E-mails or various operation guides. The standard Sip corresponding terminal 5 and the expanded sip corresponding terminal 6 shown in FIG. 1 have the same structure as that of the Sip corresponding terminal 8.

Figure 4:
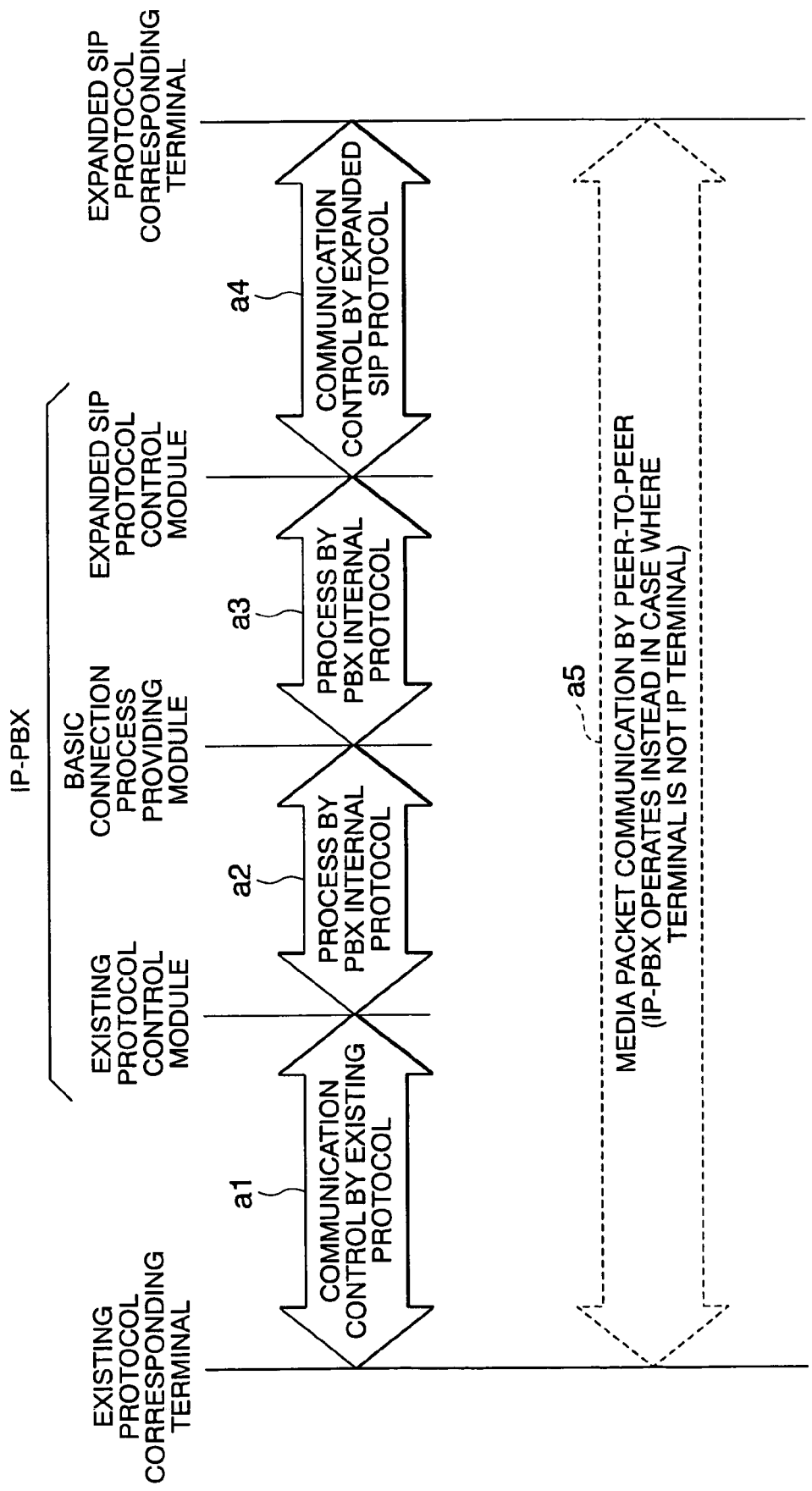
FIG. 4 is a sequence chart showing an operation of the IP-PBX in FIG. 1.
Figure 5:
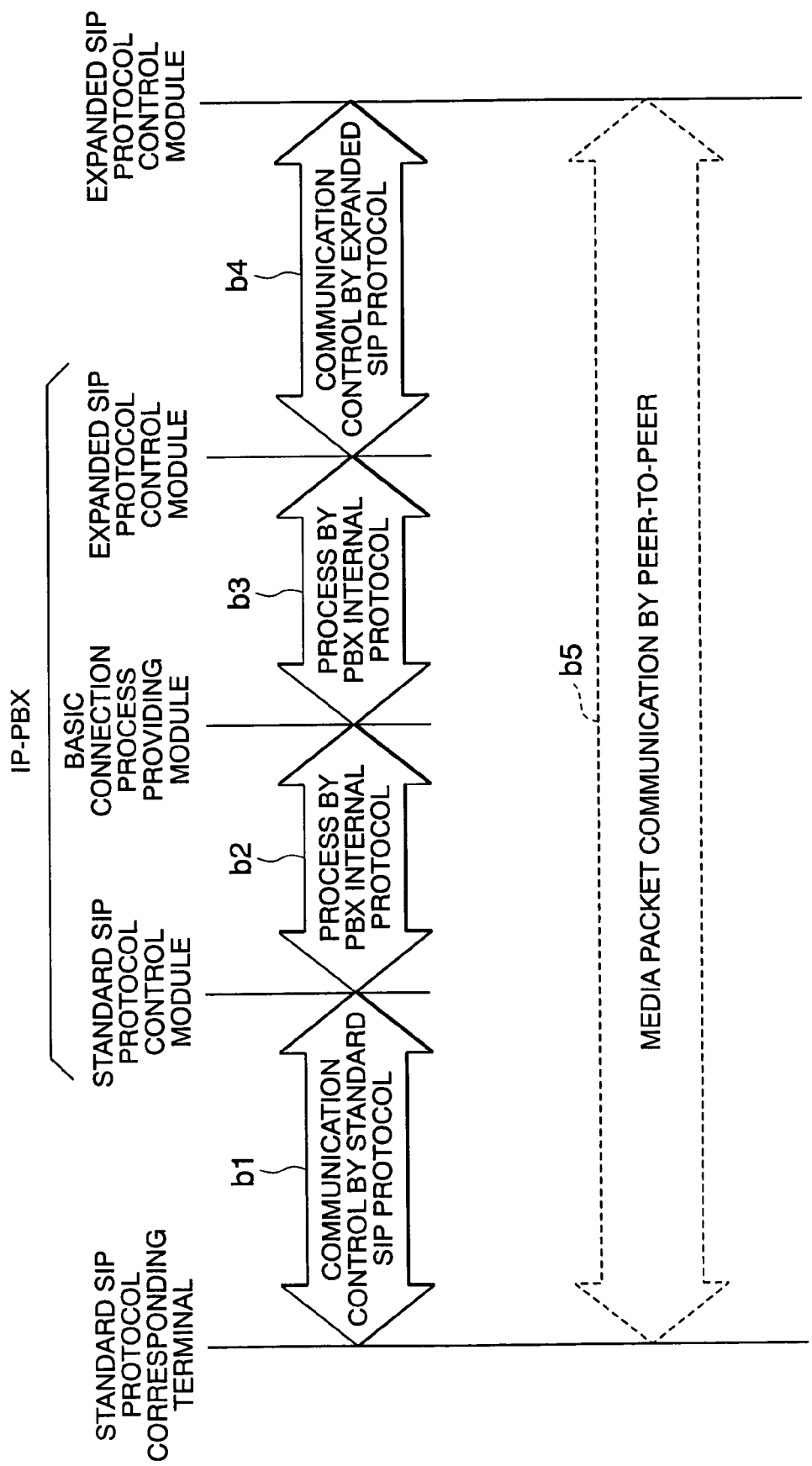
FIG. 5 is a sequence chart showing another operation of the IP-PBX in FIG. 1.

FIGS. 4 and 5 are sequence charts showing a process operation of the IP-PBX 1 of FIG. 1. The process operation of the IP-PBX 1 will be described with reference to FIGS. 1 to 5. These processes are realized by either hardware or software (program).

First, a process will be described in a case where the existing protocol corresponding terminal (the protocol A corresponding terminal 2, the protocol B corresponding terminal 3, the protocol X corresponding terminal 4 of FIG. 1) requests connection to the SIP system protocol corresponding terminal (the standard SIP protocol corresponding terminal 5, and the expanded SIP protocol corresponding terminal 6 of FIG. 1).

When the existing protocol corresponding terminal transmits a request for connection to the SIP system protocol corresponding terminal with respect to the IP-PBX 1, the existing protocol control module (the existing protocol A control module 15, existing protocol B control module 16, existing protocol X control module 17 of FIG. 2) of the IP-PBX 1 accepts the connection request from the existing protocol corresponding terminal in the communication control of the existing protocol (a1 of FIG. 4), converts the connection request of the existing protocol into the signal of the PBX internal protocol, and sends the signal to the PBX basic connection process providing module 12 (process by the PBX inner protocol) (a2 of FIG. 4).

The PBX basic connection process providing module 12 processes the connection request from the existing protocol corresponding terminal to transfer the request to the SIP system protocol control module (standard SIP protocol control module 18, expanded SIP protocol control module 19 of FIG. 2) (processing by the PBX internal protocol) (a3 of FIG. 4).

The SIP system protocol control module converts a signal from the PBX basic connection process providing module 12 into the connection request of the SIP system protocol, and transmits the connection request to the SIP protocol corresponding terminal in the communication control of the SIP system protocol (a4 of FIG. 4).

When the session between the existing protocol corresponding terminal and the SIP system protocol corresponding terminal is established by the above-described process, the media packet between the existing protocol corresponding terminal and the SIP system protocol corresponding terminal is communicated by peer-to-peer (a5 of FIG. 4). Additionally, when one of the terminals is not the IP terminal, the communication of the media packet is performed by the IP-PBX 1 instead.

It is to be noted that when the additional service of the IP-PBX 1 is utilized in the communication between the existing protocol corresponding terminal and the SIP protocol corresponding terminal, the request is transferred to the PBX additional service providing module 11 from the PBX basic connection process providing module 12 and processed.

Next, a process will be described in a case where the standard SIP protocol corresponding terminal 5 requests the connection with respect to the expanded SIP protocol corresponding terminal 6.

When the standard SIP protocol corresponding terminal 5 transmits the connection request to the expanded SIP protocol corresponding terminal 6, the standard SIP protocol control module 18 of the IP-PBX 1 accepts the connection request from the IP-PBX 1 accepts the connection request from the standard SIP protocol corresponding terminal 5 in the communication control of the standard SIP protocol (b1 of FIG. 5). The module converts the connection request of the standard SIP protocol into the signal of the PBX internal protocol, and sends the signal to the PBX basic connection process providing module 12 (processing by the PBX internal protocol) (b2 of FIG. 5).

The PBX basic connection process providing module 12 processes the connection request from the standard SIP protocol corresponding terminal 5, and transfers the request to the expanded SIP protocol control module 19 (processing by the PBX internal protocol) (b3 of FIG. 5).

The expanded SIP protocol control module 19 converts the signal from the PBX basic connection process providing module 12 into the connection request of the expanded SIP protocol, and transmits the connection request to the expanded SIP protocol corresponding terminal 6 in the expanded SIP protocol (b4 of FIG. 5).

When the session between the standard SIP protocol corresponding terminal 5 and the expanded SIP protocol corresponding terminal 6 is established by the above-described process, the media packet between the standard SIP protocol corresponding terminal 5 and the expanded SIP protocol corresponding terminal 6 is communicated by the peer-to-peer (b5 of FIG. 5).

According to this embodiment, in the structure described above, the processing in the SIP (the IP terminal protocol) is modularized by using a B2BUA mechanism, and the modularized processing is incorporated as one of the components in the IP-PBX 1. Accordingly, the Sip corresponding terminal can be controlled as one extension of the IP-PBX 1.

The IP-PBX 1 has the mechanism (the bandwidth-control-system module 13) capable of determining the audio level or the bandwidth for every kind of the IP terminals, for every network unit to which each extension (the protocol A terminal 2, the protocol B terminal 3, the protocol X terminal 4, the standard Sip corresponding terminal 5, or the expanded sip corresponding terminal 6) belongs.

Since the IP-PBX 1 has a registrar function for the IP terminals (the SIP-type-protocol registrar module 14), the IP-PBX 1 is notified of the IP addresses of the IP terminals when the IP terminals are registered. The IP-PBX 1 can determine an optimal audio level or bandwidth from the IP addresses of the two terminals communicating with each other.

For example, in the Sip corresponding terminal, the bandwidth information can be transmitted as SDP information. Hence, even in the communication between any Sip corresponding terminals including the standard Sip corresponding terminal 5, which can originally negotiate the bandwidth only in a peer-to-peer manner, the bandwidth information in accordance with the network status can be ensured. Furthermore, even in other IP terminals, interposing the IP-PBX 1 allows the same effects to be achieved as in the above case.

Since the IP-PBX 1 has a bandwidth control function (the bandwidth-control-system module 13), the IP-PBX 1 can communicate with the IP terminal only when the bandwidth required for the communication can be ensured, thus always maintaining a constant speech quality.

Defining a unique extended format in each IP protocol allows the IP terminal to be notified of the audio level determined by the IP-PBX 1. Accordingly, the IP terminal that can recognize the defined extended format can establish communication in the specified audio level.

According to this embodiment, it is possible to adjust the audio level or to control the bandwidth in accordance with the registered IP address, so that an optimal communication can be established wherever the mobile terminal accommodating the wireless LAN 200 exists. Even in communication with a terminal having a different audio level, the IP-PBX 1 that specifies a certain audio level can establish an optimal communication.

Figure 6:
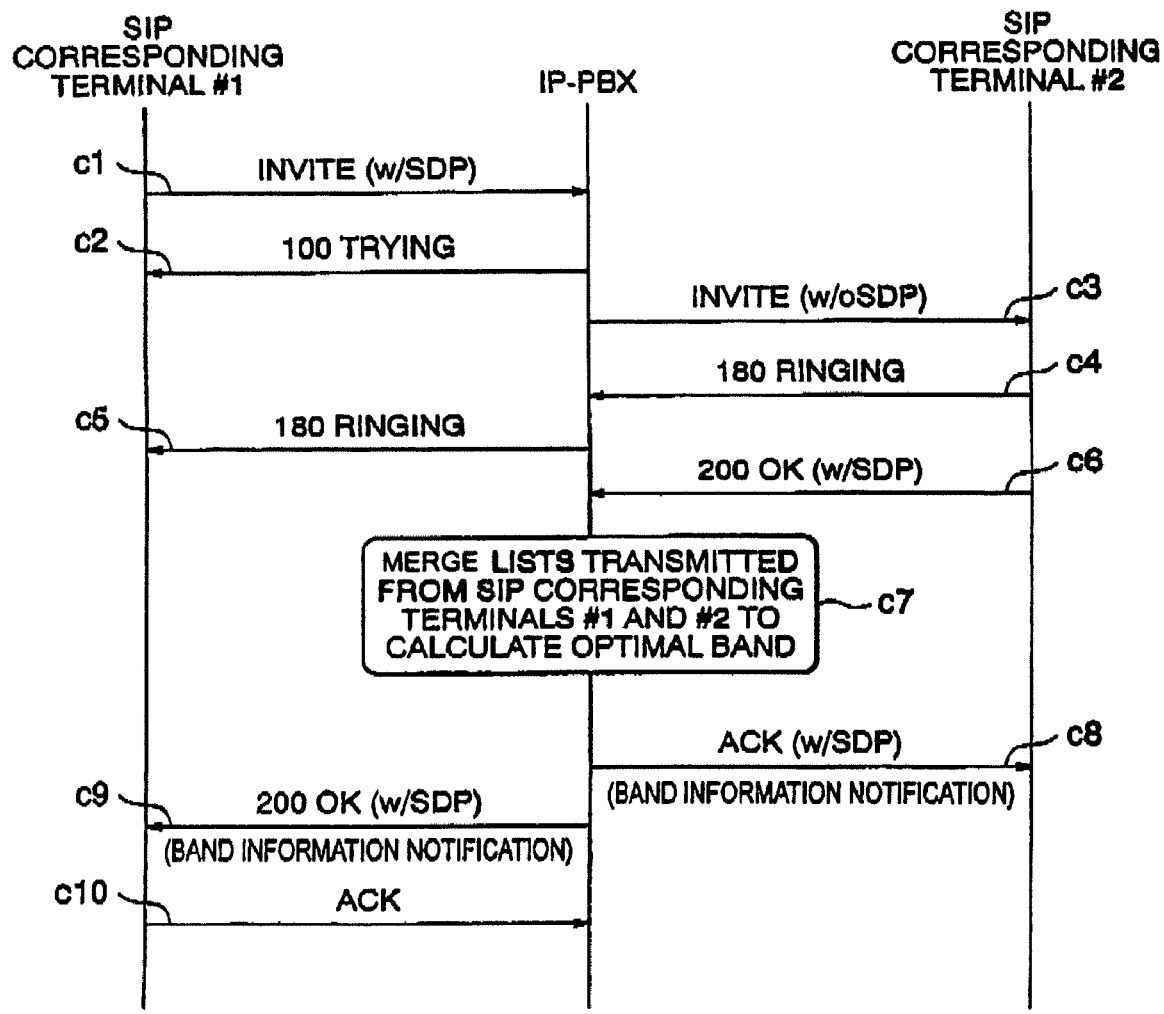
FIG. 6 is a sequence chart showing a bandwidth control operation according to an embodiment of the present invention.

FIG. 6 is a sequence chart showing a bandwidth control operation according to an embodiment of the present invention. The bandwidth control operation according to the embodiment of the present invention will now be described with reference to FIG. 6. The bandwidth control of the communication between an Sip corresponding terminal #1 and an Sip corresponding terminal #2 will be exemplified.

When the communication is to be established between the Sip corresponding terminals #1 and #2, in c1 in FIG. 6, the Sip corresponding terminal #1 transmits "INVITE (w/SDP)" including a list of the types of CODECs and bandwidth information available in the Sip corresponding terminal #1 to the IP-PBX 1. In c2, the IP-PBX 1 returns "100 Trying" to the Sip corresponding terminal #1. In c3, the IP-PBX 1 transmits "INVITE (w/oSDP)" to the Sip corresponding terminal #2.

When the Sip corresponding terminal #2 returns "180 Ringing" to the IP-PBX 1 in c4, then in c5, the IP-PBX 1 transmits the "180 Ringing" to the Sip corresponding terminal #1. When the Sip corresponding terminal #2 transmits "200 OK(w/SDP)" including a list of the types of CODECs and bandwidth information available in the Sip corresponding terminal #2 to the IP-PBX 1 in c6, then in c7, the IP-PBX 1 merges the lists transmitted from the Sip corresponding terminals #1 and #2 to calculate an optimal bandwidth.

In c8, the IP-PBX 1 transmits "ACK (w/SDP)" including the calculated optimal bandwidth information to the Sip corresponding terminal #2. In cg, the IP-PBX 1 transmits "200 OK(w/SDP)" including the calculated optimal bandwidth information to the Sip corresponding terminal #1. In this manner, the Sip corresponding terminals #1 and #2 are informed of the optimal bandwidth information by the IP-PBX 1.

Since the Sip corresponding terminal #1 transmits "ACK" to the IP-PBX 1 in c10, a session is established between the Sip corresponding terminals #1 and #2 in the optimal bandwidth.

Figure 7:
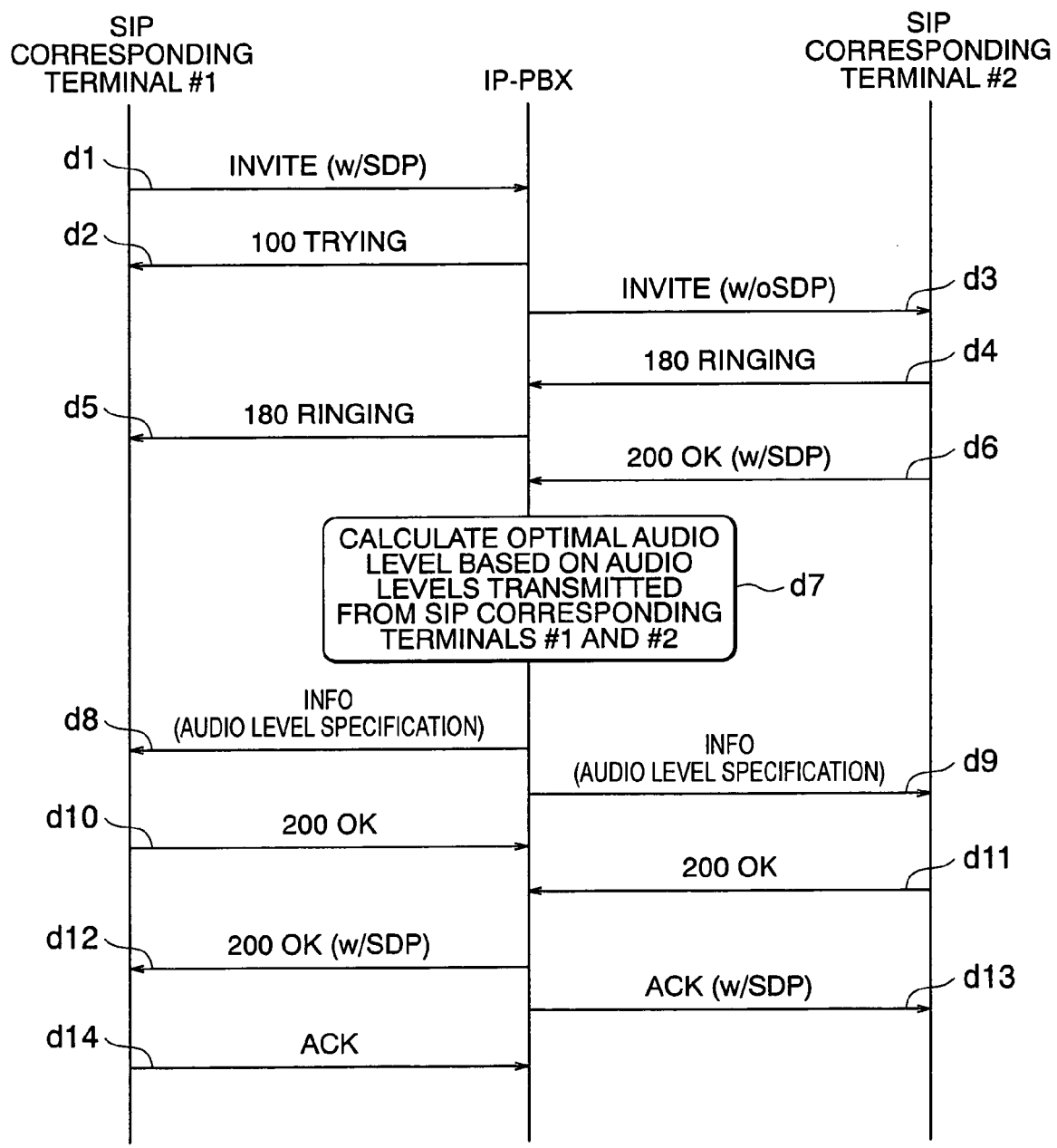
FIG. 7 is a sequence chart showing an adjustment operation of an audio level according to an embodiment of the present invention.

FIG. 7 is a sequence chart showing an adjustment operation of an audio level according to an embodiment of the present invention. The adjustment operation of an audio level according to the embodiment of the present invention will now be described with reference to FIG. 7. The adjustment of an audio level of the communication between the Sip corresponding terminals #1 and #2 will be exemplified.

When the communication is to be established between the Sip corresponding terminals #1 and #2, in d1 in FIG. 7, the Sip corresponding terminal #1 transmits "INVITE (w/SDP)" to the IP-PBX 1. In d2, the IP-PBX 1 returns "100 Trying" to the Sip corresponding terminal #1. In d3, the IP-PBX 1 transmits "INVITE (w/oSDP)" to the Sip corresponding terminal #2.

When the Sip corresponding terminal #2 returns "180 Ringing" to the IP-PBX 1 in d4, then in d5, the IP-PBX 1 transmits "180 Ringing" to the Sip corresponding terminal #1. When the Sip corresponding terminal #2 transmits "200 OK(w/SDP)" to the IP-PBX 1 in d6, then in d7, the IP-PBX 1 detects the audio levels in the Sip corresponding terminals #1 and #2 to calculate an optimal audio level based on the detection result.

In d8 and d9, the IP-PBX 1 transmits "INFO (audio level specification)" including the calculated optimal audio level to the Sip corresponding terminals #1 and #2. When the Sip corresponding terminals #1 and #2 return "200 OK" to the IP-PBX 1 in d10 and d11, then in d12, the IP-PBX 1 transmits "200 OK(w/SDP)" to the Sip corresponding terminal #1, and then in d13, the IP-PBX 1 transmits "ACK (w/SDP)" to the Sip corresponding terminal #2.

Since the Sip corresponding terminal #1 transmits "ACK" to the IP-PBX 1 in d14, a session is established between the Sip corresponding terminals #1 and #2 in the optimal audio level.

Referring to FIGS. 6 and 7, the "INVITE" denotes a method used for establishing a session between subscribers, the "100 Trying" denotes a status of trial, the "INFO" denotes a method used for notifying information, the "180 Ringing" denotes a status of calling, the "200 OK" denotes a success response, and the "ACK" denotes a method used for allowing the establishment of a session.

As described above, according to this embodiment, the processing in an IP terminal protocol, for example, the processing in the SIP, is modularized by using the B2BUA mechanism, and the modularized processing is incorporated as one of the components in the server apparatus, such as the IP-PBX 1. Accordingly, the IP terminal (the standard Sip corresponding terminal 5 or the expanded sip corresponding terminal 6) can be controlled as one extension of the IP-PBX 1 in this embodiment.

The IP-PBX 1, in which the processing in the IP terminal protocol is modularized and incorporated, has the mechanism capable of determining the audio level or the bandwidth for every kind of the IP terminals, for every network unit to which each extension belongs. In other words, since the IP-PBX 1 has a registrar function for the IP terminals serving as extensions, the IP-PBX 1 is notified of the IP addresses of the IP terminals when the IP terminals are registered. The IP-PBX 1 can determine an optimal speech quality, such as an optimal audio level or bandwidth, from the IP addresses.

For example, in the Sip corresponding terminal, the bandwidth information can be transmitted as SDP information. Hence, even in the communication between any Sip corresponding terminals including the standard Sip corresponding terminal 5, which can originally negotiate the bandwidth information only in a peer-to-peer manner, the bandwidth in accordance with the network status can be ensured. Furthermore, even in other IP terminals, interposing the IP-PBX 1 for negotiating the bandwidth information allows the same effects to be achieved as in the above case.

Since the IP-PBX 1 has the bandwidth control function, the IP-PBX 1 can communicate with the IP terminal only when the bandwidth required for the communication can be ensured, thus always maintaining a constant speech quality.

Defining a unique extended format in each IP protocol allows the IP terminal to be notified of the audio level determined by the IP-PBX 1. Accordingly, the IP terminal that can recognize the defined extended format can establish communication in the specified audio level.

According to this embodiment, it is possible to adjust the audio level or to control the bandwidth in accordance with the registered IP address, so that an optimal communication can be established wherever the mobile terminal accommodating the wireless LAN 200 exists. Even in communication with a terminal having a different audio level, the IP-PBX 1 that specifies a certain audio level can establish an optimal communication.

As described above, according to this embodiment, an IP client terminal conforming to an IP typified by the SIP is incorporated in the service provided by the IP-PBX 1, and the bandwidth control, which can originally be performed only between terminals, is performed in accordance with the network bandwidth, thus ensuring a stable speech communication.

Although it has been impossible to change the audio level between the IP terminals for every network, interposing the IP-PBX 1 allows the audio level to be adjusted for every destination in this embodiment.

Figure 8:
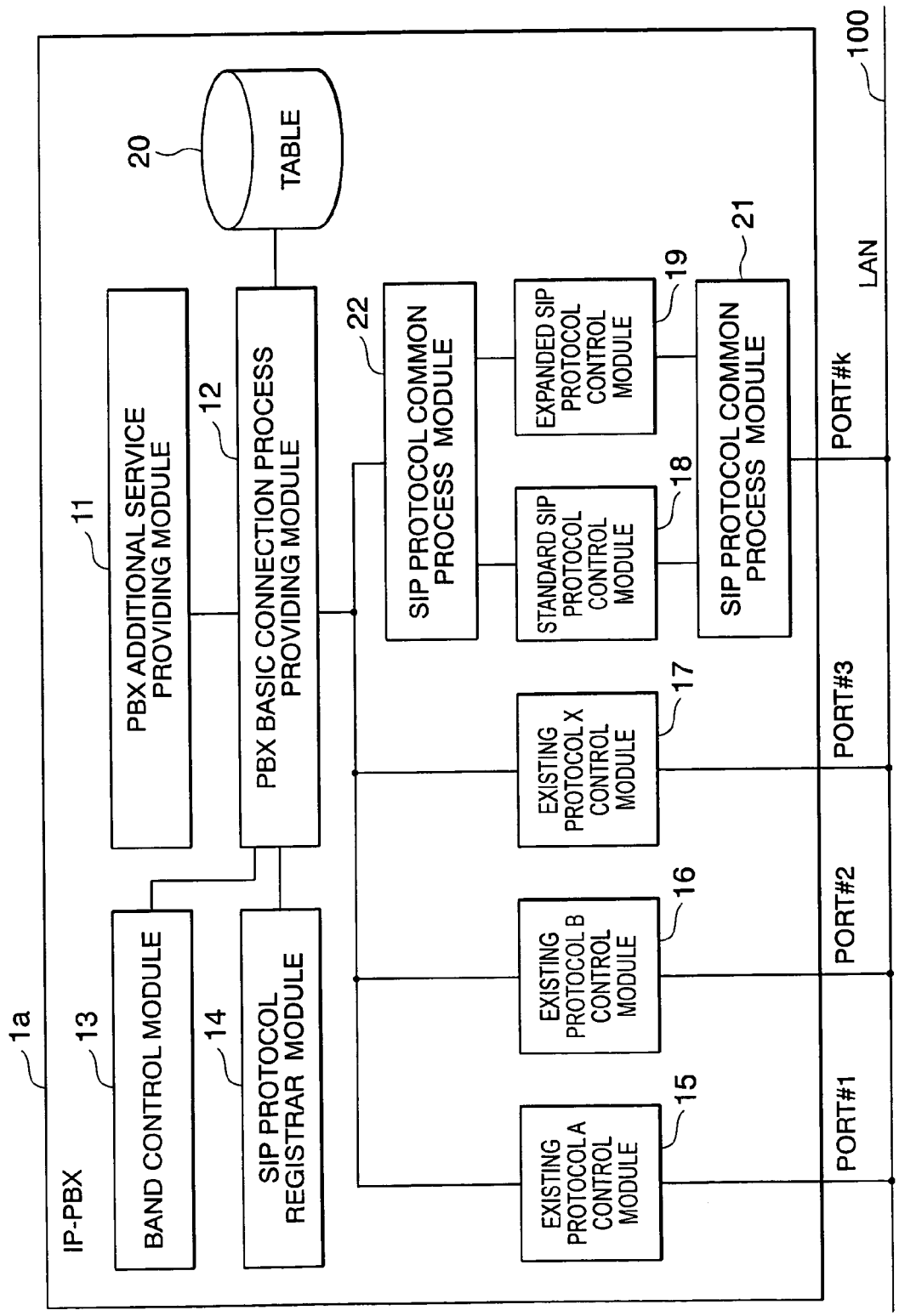
FIG. 8 is a block diagram of an IP-PBX according to another embodiment of the present invention.
Figure 9:
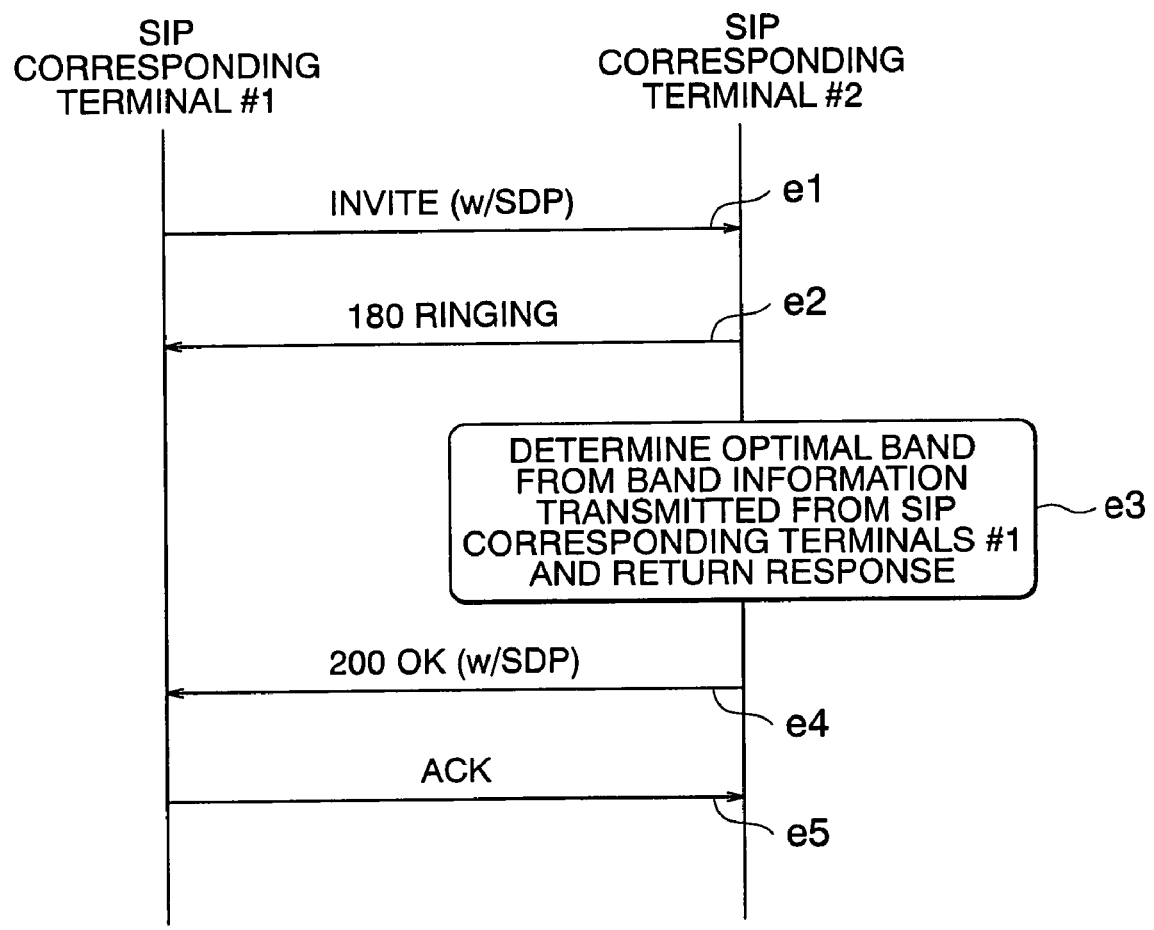
FIG. 9 is a sequence chart showing a known bandwidth control operation.
Figure 10:
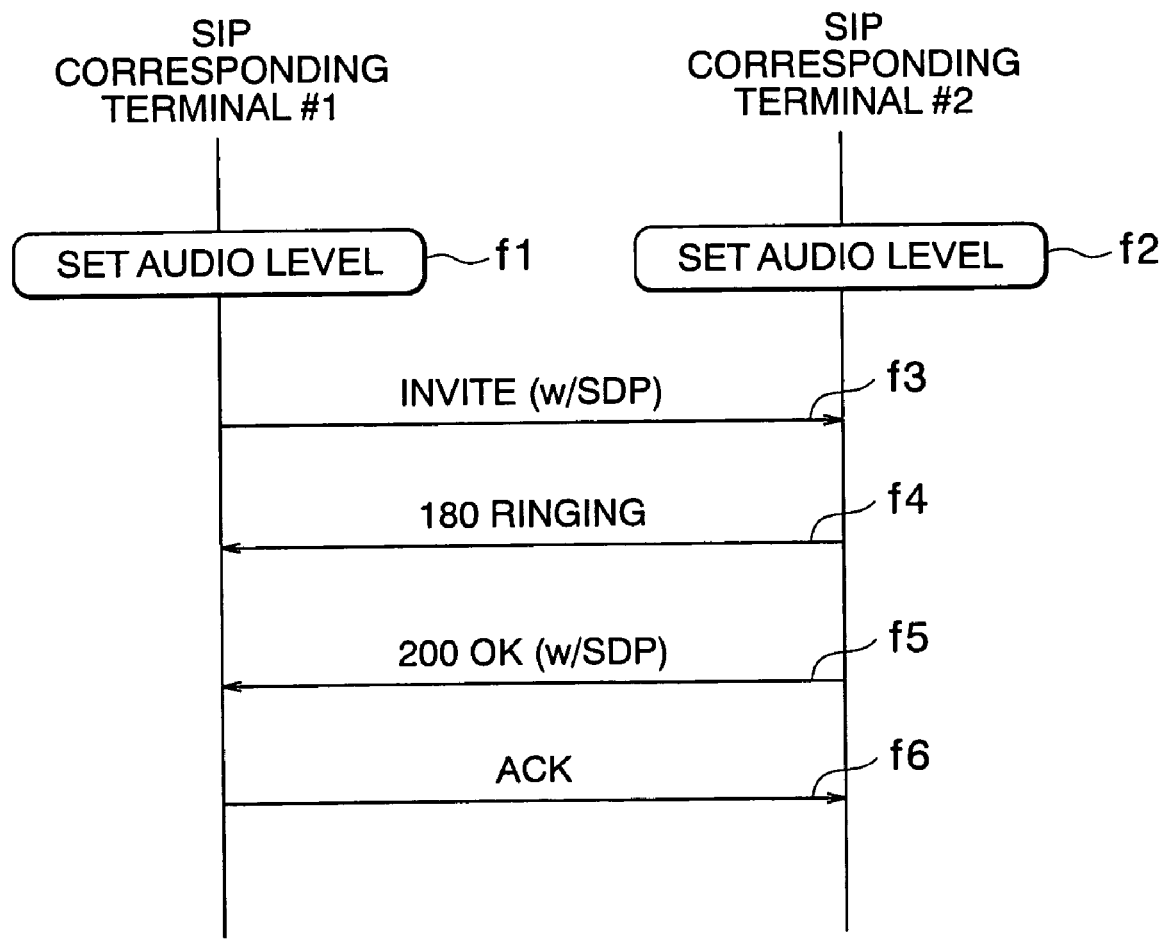
FIG. 10 is a sequence chart showing a known adjustment operation of an audio level.

FIG. 8 is a block diagram of an IP-PBX according to another embodiment of the present invention. Referring to FIG. 8, an IP-PBX 1a of this embodiment has the same structure as that of the IP-PBX 1 in the above embodiment in FIG. 2 except that common processing in the standard SIP control module 18 and the expanded sip control module 19 is modularized to provide SIP-type-protocol common processing modules 21 and 22. The same reference numerals are used in FIG. 8 to identify the same components shown in FIG. 2.

The standard SIP control module 18 and the expanded sip control module 19 are modularized except for the common processing. Although the SIP-type-protocol common processing module 21 and 22 are provided at the side of the LAN 100 and at the side of the PBX basic-connection-process providing module 12, respectively, with respect to the standard SIP control module 18 and the expanded sip control module 19 in this embodiment, the SIP-type-protocol common processing modules 21 and 22 may be provided as one module.

Although the ports #4 and #5 are allocated to the standard SIP control module 18 and the expanded sip control module 19, respectively, in the above embodiment described above, a common port #k is allocated to the SIP-type-protocol common processing module 21 in the this embodiment.

According to the present invention, incorporating the IP client terminal conforming to an IP typified by the SIP into the services provided by the IP-PBX 1 and the IP-PBX 1a can establish an optimal communication between the IP terminals without the negotiation between the IP terminals. Although the IP-PBX 1, the IP-PBX 1a, and the Sip corresponding terminal are described in the above embodiments, the present invention can be applied to another server apparatus as long as the apparatus has a negotiation function including the bandwidth control and the adjustment of the audio level. The present invention can be applied to another IP terminal, such as IP phone terminal or an Internet phone terminal, other than the Sip corresponding terminal.

As described above, the present invention can be applied not only to the provision of the service of the PBX of the Sip corresponding terminal in the network including the LAN, but also to the call connection processing over an external IP network including the Internet. Furthermore, the present invention can be applied to an IP Centrex for providing the PBX function over an IP network.

What is claimed is:

1. A network comprising:
    Internet protocol terminals for establishing communication using an initiation protocol used in connection-oriented communication in which connection to a destination is confirmed over an IP network for the communication; and
    a server apparatus constituting the network along with the Internet protocol terminals, the server apparatus comprising:
    a detecting unit for detecting a speech quality between the Internet protocol terminals;
    a calculating unit for calculating an optimal speech quality based on the detected speech quality information; and
    a notifying unit for notifying the Internet protocol terminals establishing communication of the calculated optimal speech quality,
        wherein the Internet protocol terminals establish communication with the speech quality being set to the optimal speech quality, which the server apparatus notifies to the Internet protocol terminals,
        wherein the speech quality is detected during the establishing of communications between the Internet protocol terminals,
        wherein the calculating unit determines an audio level based on signals transmitted from the Internet protocol terminals establishing communication to calculate an optimal audio level based on the determined audio level,
        wherein each of the Internet protocol terminals includes a notifying unit for notifying the server apparatus of a list of the types of CODECs and bandwidth information being used in the communication and being available in the Internet protocol terminal, and
        wherein the calculating unit calculates an optimal bandwidth based on the list of the types of CODECs and bandwidth information supplied from the Internet protocol terminals establishing communication.

2. The network according to claim 1,
    wherein the Internet protocol terminals are session initiation protocol terminals for communication using a session initiation protocol used in connection-oriented communication in which connection to a destination is confirmed over the IP network for the communication.

3. The network according to claim 2,
    wherein the server apparatus is an Internet protocol private branch exchange for performing call connection processing between the session initiation protocol terminals.

4. The network according to claim 3, further comprising a SIP protocol control module which is incorporated as one component in the Internet protocol private branch exchange and in which the processing in the session initiation protocol is modularized by using a back-to-back user agent mechanism serving as a representative user agent.

5. The network according to claim 2,
    wherein the session initiation protocol is a communication protocol for use in starting or terminating multimedia communication by using data in an IP packet format.

6. The network according to claim 4,
    wherein the SIP protocol control module is provided corresponding to each of the session initiation protocol terminals having different protocols.

7. The network according to claim 3,
    wherein the Internet protocol private branch exchange provides at least one of interconnection and an additional service to each modularized protocol.

8. A server apparatus in a network including Internet protocol terminals for establishing communication using an initiation protocol used in connection-oriented communication in which connection to a destination is confirmed over an IP network for the communication, the server apparatus comprising:
    a detecting unit for detecting a speech quality between the Internet protocol terminals;
    a calculating unit for calculating an optimal speech quality based on the detected speech quality information; and
    a notifying unit for notifying the Internet protocol terminals establishing communication of the calculated optimal speech quality, wherein the speech quality is detected during the establishing of communications between the Internet protocol terminals, wherein the calculating unit determines an audio level based on signals transmitted from the Internet protocol terminals establishing communication to calculate an optimal audio level based on the determined audio level, wherein the calculating unit calculates an optimal bandwidth based on a list of the types of CODECs and bandwidth information being supplied from the Internet protocol terminals establishing communication and being available in the Internet protocol terminal for the communication.

9. The server apparatus according to claim 8, wherein the server apparatus is an Internet protocol private branch exchange for performing call connection processing between session initiation protocol terminals that establish communication using a session initiation protocol used in connection-oriented communication in which connection to a destination is confirmed over the IP network for the communication.

10. The server apparatus according to claim 9, further comprising a SIP protocol control module which is incorporated as one component in the server apparatus and in which the processing in the session initiation protocol is modularized by using a back-to-back user agent mechanism serving as a representative user agent.

11. The server apparatus according to claim 9, wherein the session initiation protocol is a communication protocol for use in starting or terminating multimedia communication by using data in an IP packet format.

12. The server apparatus according to claim 10, wherein the SIP protocol control module is provided corresponding to each of the session initiation protocol terminals having different protocols.

13. The server apparatus according to claim 9, wherein the server apparatus provides at least one of interconnection and an additional service to each modularized protocol.

14. A speech-quality control method of controlling the quality of speech in a network including Internet protocol terminals for establishing communication using an initiation protocol used in connection-oriented communication in which connection to a destination is confirmed over an IP network for the communication, and a server apparatus constituting the network along with the Internet protocol terminals, comprising the steps of:

detecting, by the server apparatus, a speech quality between the Internet protocol terminals;

calculating, by the server apparatus, an optimal speech quality based on the detected speech quality information;

notifying, by the server apparatus, the Internet protocol terminals establishing communication of the calculated optimal speech quality; and establishing, by the Internet protocol terminals, communication with the speech quality being set to the optimal speech quality, which the server apparatus notifies to the Internet protocol terminals, wherein the speech quality is detected during the establishing of communications between the Internet protocol terminals, wherein the server apparatus determines an audio level based on signals transmitted from the Internet protocol terminals establishing communication to calculate an optimal audio level based on the determined audio level, wherein each of the Internet protocol terminals notifies the server apparatus of a list of the types of CODECs and bandwidth information being used in the communication and being available in the Internet protocol terminal, wherein the server apparatus calculates an optimal bandwidth based on the list of the types of CODECs and bandwidth information supplied from the Internet protocol terminals establishing communication.

15. The speech-quality control method according to claim 14, wherein the Internet protocol terminals are session initiation protocol terminals for communication using a session initiation protocol used in connection-oriented communication in which connection to a destination is confirmed over the IP network for the communication.

16. The speech-quality control method according to claim 15, wherein the server apparatus is an Internet protocol private branch exchange for performing call connection processing between the session initiation protocol terminals.

17. The speech-quality control method according to claim 16, wherein an SIP-type-protocol control module is incorporated as one component in the Internet protocol private branch exchange, and the processing in the session initiation protocol is modularized in the SIP-type-protocol control module by using a back-to-back user agent mechanism that serves as a representative user agent.

18. The speech-quality control method according to claim 15, wherein the session initiation protocol is a communication protocol for use in starting or terminating multimedia communication by using data in an II' packet format.

19. The speech-quality control method according to claim 17, wherein the SIP-type-protocol control module is provided corresponding to each of the session initiation protocol terminals having different protocols.

20. The speech-quality control method according to claim 16, wherein the Internet protocol private branch exchange provides at least one of interconnection and an additional service to each modularized protocol.

* * * * *